United States Patent
Yamada

(10) Patent No.: US 11,378,930 B2
(45) Date of Patent: Jul. 5, 2022

(54) NUMERICAL CONTROLLER, MACHINE TOOL SYSTEM, AND NUMERICAL CONTROL METHOD

(71) Applicant: FANUC CORPORATION, Yamanashi (JP)

(72) Inventor: Takayuki Yamada, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 17/007,870

(22) Filed: Aug. 31, 2020

(65) Prior Publication Data

US 2021/0096528 A1    Apr. 1, 2021

(30) Foreign Application Priority Data

Oct. 1, 2019  (JP) .............................. JP2019-181437

(51) Int. Cl.
*G05B 19/18* (2006.01)
*B23Q 15/12* (2006.01)

(52) U.S. Cl.
CPC ........... *G05B 19/182* (2013.01); *B23Q 15/12* (2013.01); *G05B 2219/36198* (2013.01)

(58) Field of Classification Search
None
See application file for complete search history.

(56) References Cited

U.S. PATENT DOCUMENTS

| | | | | |
|---|---|---|---|---|
| 9,707,655 B2 * | 7/2017 | Hessenkamper | ....... | B23B 37/00 |
| 2013/0309034 A1 * | 11/2013 | Inagaki | ................ | G05B 19/404 |
| | | | | 409/132 |
| 2016/0266567 A1 * | 9/2016 | Watanabe | ............ | B23Q 15/013 |
| 2018/0281090 A1 * | 10/2018 | Watanabe | ................ | B23G 1/02 |
| 2019/0310600 A1 * | 10/2019 | Yamamoto | ............. | G05B 19/19 |
| 2019/0310601 A1 * | 10/2019 | Yamamoto | ............. | G05B 19/19 |
| 2019/0310602 A1 * | 10/2019 | Yamamoto | ........... | G05B 19/186 |

FOREIGN PATENT DOCUMENTS

WO    2016/056526 A1    4/2016

* cited by examiner

*Primary Examiner* — Ryan A Jarrett
(74) *Attorney, Agent, or Firm* — Studebaker & Brackett PC

(57) ABSTRACT

It is possible to suppress core misalignment from occurring due to relative vibration between a cutting tool and a workpiece, to improve accuracy of a finished shape, and to suppress a tip of the cutting tool from being influenced. A numerical controller that causes a machine tool to perform an operation for performing thread cutting through which a cutting tool and a machining target are allowed to move relative to each other to perform cutting-in processes a plurality of times on the machining target to form a thread on the machining target, including: a driver that controls a spindle that rotates the machining target, and drive axes having three axes; a vibration superimposing unit that superimposes vibration to be applied to two axes or more among the three axes on the relative movement between the cutting tool and the machining target so that the cutting tool and the machining target vibrate relative to each other along a thread groove; and a thread cutting vibration adjusting unit that shifts, by a vibration phase shift amount set beforehand, a phase of the vibration relative to a phase of the spindle per each of the cutting-in processes to be performed the plurality of times.

7 Claims, 19 Drawing Sheets

NUMERICAL CONTROLLER, MACHINE TOOL SYSTEM, AND NUMERICAL CONTROL METHOD

This application is based on and claims the benefit of priority from Japanese Patent Application No. 2019-181437, filed on 1 Oct. 2019, the content of which is incorporated herein by reference.

BACKGROUND OF THE INVENTION

Field of the Invention

The present invention relates to a numerical controller, a machine tool system, and a numerical control method. The present invention particularly relates to a numerical controller, a machine tool system, and a numerical control method each causing a machine tool to perform thread cutting while shredding chips.

Related Art

Such a numerical controller for a machine tool that performs thread cutting while shredding chips has been described in WO2016/056526, for example. WO2016/056526 describes such a controller for a machine tool that avoids, when thread cutting is performed on a workpiece, long extended chips from wrapping around a workpiece or a cutting tool, as well as avoids a machining surface of the workpiece from being damaged. Specifically, WO2016/056526 describes the controller for a machine tool, which is provided with vibration setting means that sets, during thread cutting through which a workpiece and a cutting tool are allowed to rotate relative to each other, to feed-move relative to each other in a machining feed direction, and to vibrate relative to each other in radial directions of the workpiece to helically perform cutting-in processes a plurality of times, a pattern of vibration during each of the cutting-in processes involving the vibration in such a manner that a part already machined by a different cutting-in process is partially present in a part to be machined by a predetermined cutting-in process.

Patent Document 1: Pamphlet of PCT International Publication No. WO2016/056526

SUMMARY OF THE INVENTION

To improve machining accuracy when a machine tool performs thread cutting on a workpiece, it is desirable to suppress as much as possible the workpiece being rotated from being influenced by relative vibration between a cutting tool and the workpiece. On this point, in the controller described in WO2016/056526, since a cutting tool is vibrated only on one axis in radial directions of a workpiece, core misalignment would likely occur on the workpiece being rotated. Therefore, it has been demanded to suppress core misalignment from occurring due to relative vibration between a cutting tool and a machining target, to improve accuracy of a finished shape, and to suppress a tip of the cutting tool from being influenced.

(1) A first aspect of the present disclosure is a numerical controller that causes a machine tool to perform an operation for performing thread cutting through which a cutting tool and a machining target are allowed to move relative to each other to perform cutting-in processes a plurality of times on the machining target to form a thread on the machining target, the numerical controller including: a driver that controls a spindle that rotates the machining target, and drive axes having three axes;
a vibration superimposing unit that superimposes vibration to be applied to two axes or more among the three axes on the relative movement between the cutting tool and the machining target so that the cutting tool and the machining target vibrate relative to each other along a thread groove;
and a thread cutting vibration adjusting unit that shifts, by a vibration phase shift amount set beforehand, a phase of the vibration relative to a phase of the spindle per each of the cutting-in processes to be performed the plurality of times.

(2) A second aspect of the present disclosure is a machine tool system including:
the numerical controller according to (1) described above;
and a machine tool that allows a cutting tool and a machining target to move relative to each other to perform cutting-in processes a plurality of times on the machining target to form a thread on the machining target.

(3) A third aspect of the present disclosure is a numerical control method for a numerical controller that causes a machine tool to perform an operation for performing thread cutting through which a cutting tool and a machining target are allowed to move relative to each other to perform cutting-in processes a plurality of times on the machining target to form a thread on the machining target, the numerical control method including:
controlling a spindle that rotates the machining target, and drive axes having three axes;
superimposing vibration to be applied to two axes or more among the three axes on the relative movement between the cutting tool and the machining target so that the cutting tool and the machining target vibrate relative to each other along a thread groove; and
shifting, by a vibration phase shift amount set beforehand, a phase of the vibration relative to a phase of the spindle per each of the cutting-in processes to be performed the plurality of times.

According to the aspects of the present disclosure, where, in thread cutting on a machining target by a machine tool, vibration is applied to two axes or more among an X axis, a Y axis, and a Z axis, it is possible to suppress core misalignment from occurring due to relative vibration between a cutting tool and the machining target, to improve accuracy of a finished shape, and to suppress a tip of the cutting tool from being influenced.

DETAILED DESCRIPTION OF THE INVENTION

An embodiment of the present disclosure will now be described herein in detail with reference to the accompanying drawings.

Figure 1:
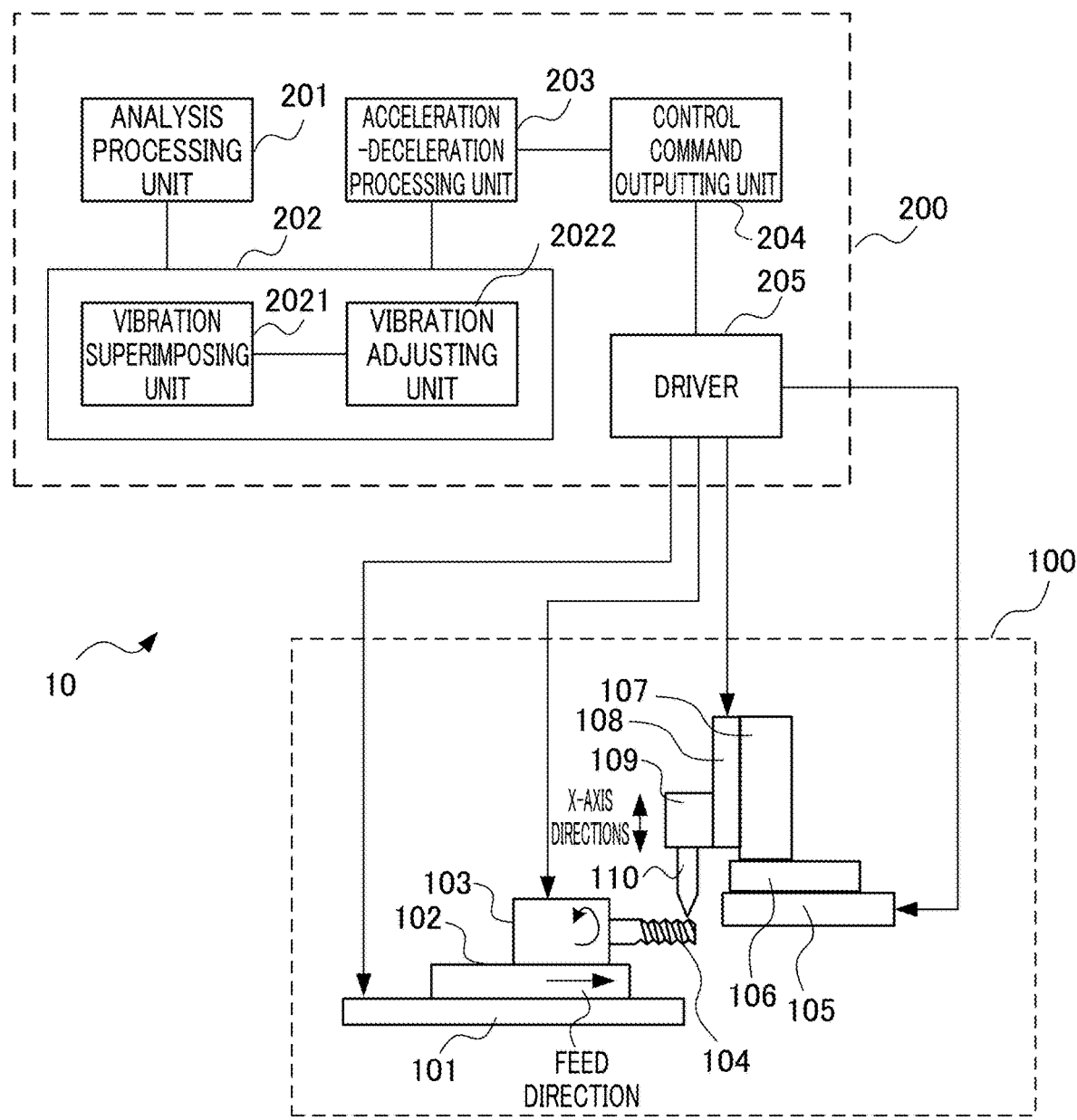
FIG. 1 is a block diagram showing a machine tool system according to an embodiment of the present disclosure.

FIG. 1 is a block diagram showing a machine tool system according to the embodiment of the present disclosure. As shown in FIG. 1, a machine tool system 10 includes a machine tool 100, and a numerical controller 200. Note that the numerical controller 200 may be included in the machine tool 100.

The machine tool 100 will first be described. The machine tool 100 includes, as shown in FIG. 1, a linear servomotor 101, a spindle table 102, a spindle motor 103, and a workpiece 104. The spindle motor 103 rotates the workpiece 104 serving as a machining target attached, via a chuck, to a rotary axis (not shown). The linear servomotor 101 moves the spindle table 102 attached with the spindle motor 103 in a feed direction along a Z axis, shown in FIG. 1, to move the workpiece 104 in the feed direction. The linear servomotor 101 further moves the workpiece 104 back and forth in Z-axis directions in a superimposed manner on the movement of workpiece 104 in the feed direction. As the workpiece 104 is moved in the feed direction, a cutting tool 110 performs a cutting-in process from a tip end of the workpiece 104 being rotated to form a thread. As the cutting-in processes are performed a plurality of times, the thread is formed.

The machine tool 100 further includes a linear servomotor 105, a support table 106, a support column 107, a linear servomotor 108, a tool table 109, and the cutting tool 110. The linear servomotor 105 moves the support table 106 back and forth in Y-axis directions (not shown). A tool bit or a similar tool that performs a cutting-in process on the workpiece 104 being rotated is used as the cutting tool 110. The support column 107 is provided on the support table 106. The linear servomotor 108 is attached to a side surface of the support column 107 to move the tool table 109 attached with the cutting tool 110 back and forth in X-axis directions. Note that back-and-forth movement in the X-axis directions, back-and-forth movement in the Y-axis directions, and back-and-forth movement in the Z-axis directions respectively correspond to vibration in the X-axis directions, vibration in the Y-axis directions, and vibration in the Z-axis directions. Back-and-forth movement will be hereinafter referred to as vibration.

The workpiece 104 is rotated by the spindle motor 103, as well as is moved in the feed direction along the Z axis by the linear servomotor 101. Furthermore, the workpiece 104 is vibrated in the Z-axis directions by the linear servomotor 101. As a result, the cutting tool 110 is vibrated in the Z-axis directions relative to the workpiece 104. The cutting tool 110 is then vibrated in the Y-axis directions by the linear servomotor 105, as well as is vibrated in the X-axis directions by the linear servomotor 108. As movement in the feed direction along the Z axis and vibration in the Z-axis directions of the workpiece 104 being rotated cooperate with vibration in the X-axis directions and the Y-axis directions of the cutting tool 110, the cutting tool 110 performs thread cutting on the workpiece 104. Operation where, as the workpiece 104 is vibrated in the Z-axis directions by the linear servomotor 101, the cutting tool 110 is vibrated in the Z-axis directions relative to the workpiece 104 will be described below as vibration in the Z-axis directions of the cutting tool 110.

Figure 2:
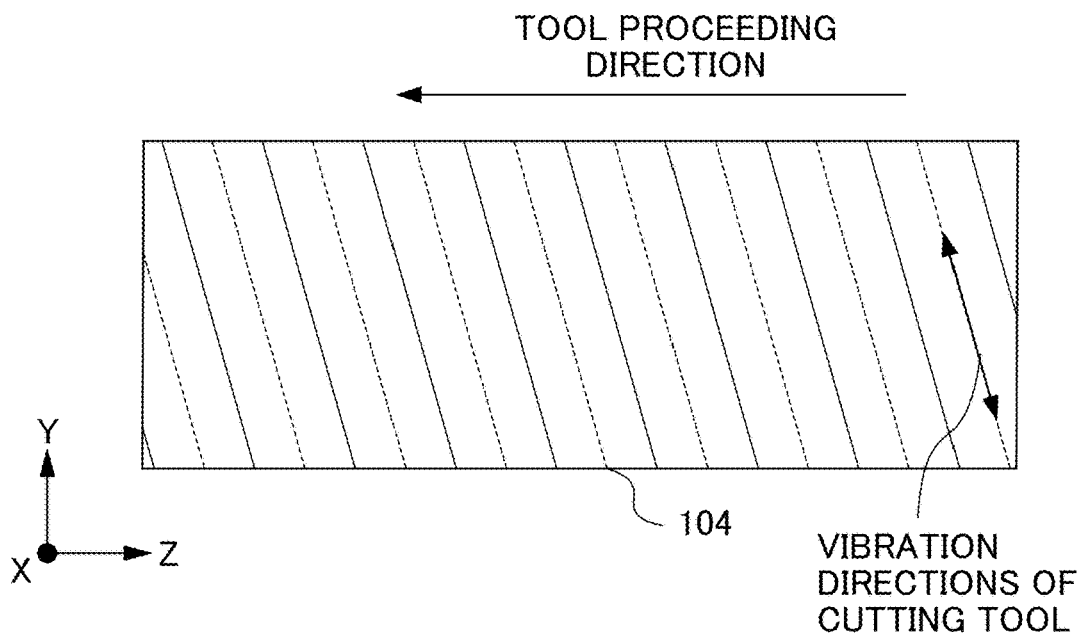
FIG. 2 is a top view showing, when a workpiece is seen from a cutting tool, vibration directions of the cutting tool in thread groove directions of the workpiece.
Figure 3:
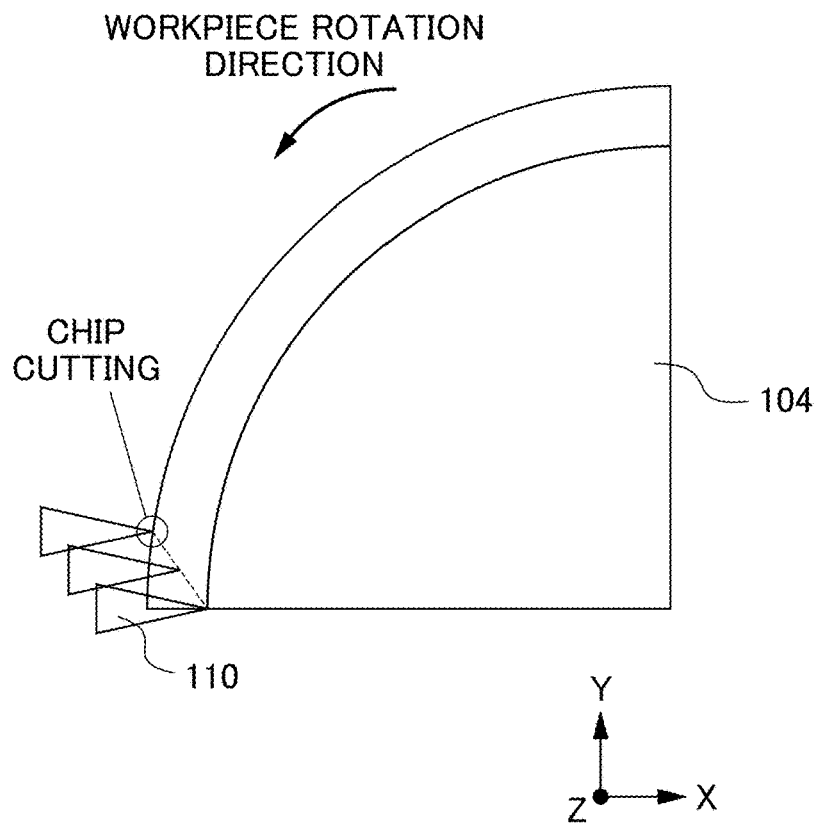
FIG. 3 is a partial cross-sectional view showing, seen from a tip end side of the workpiece, the vibration directions of the cutting tool relative to the workpiece.
Figure 4:
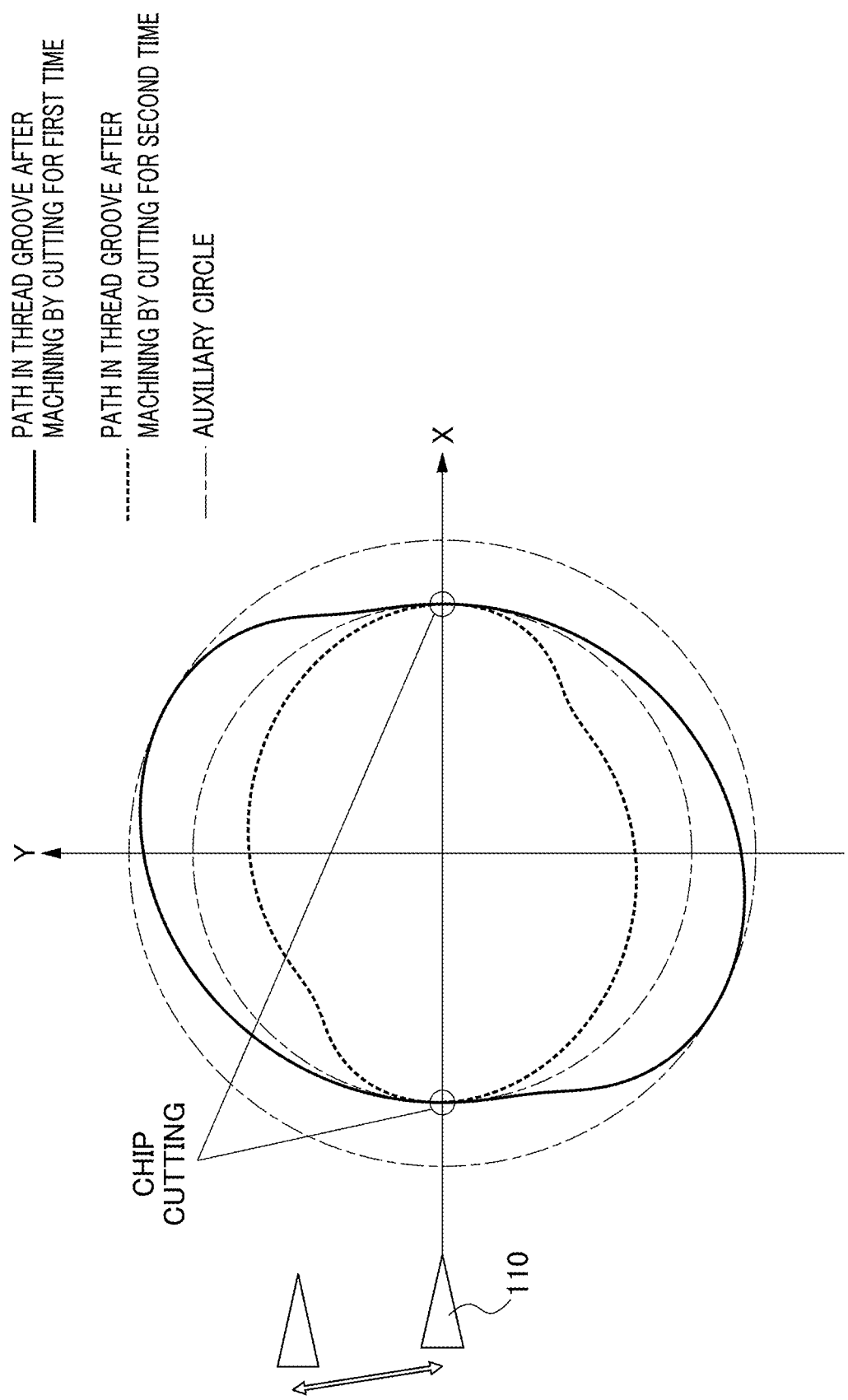
FIG. 4 is a conceptual diagram showing paths of the cutting tool in one thread groove on the workpiece, seen from Z-axis directions, after having undergone cutting-in processes for a first time and a second time.

Vibration in the X-axis directions, the Y-axis directions, and the Z-axis directions of the cutting tool 110 is shown in FIGS. 2 and 3. FIG. 2 is a top view showing, when the workpiece 104 is seen from a side of the cutting tool 110, vibration directions of the cutting tool 110 in thread groove directions of the workpiece 104. In FIG. 2, the cutting tool 110 is not shown. FIG. 3 is a partial cross-sectional view showing, seen from a tip end side of the workpiece 104, the vibration directions of the cutting tool 110 relative to the workpiece 104. A tool proceeding direction shown in FIG. 2 shows a direction in which, as the workpiece 104 is moved in the feed direction along the Z axis by the linear servomotor 101, the cutting tool 110 is moved relative to the workpiece 104. In FIGS. 3 and 4, the cutting tool 110 is shown as a triangle for the purpose of simplification.

As shown in FIG. 2, the cutting tool 110 is vibrated in the Y-axis directions and the Z-axis directions. The vibration directions are identical to the thread groove directions. As shown in FIG. 3, the cutting tool 110 is also vibrated in the X-axis directions, in addition to the vibration in the Y-axis directions and the Z-axis directions shown in FIG. 2. As shown in FIG. 3, chips are cut at a portion where a tip end of the cutting tool 110 reaches an outer peripheral surface of the workpiece 104.

FIG. 4 is a conceptual diagram showing paths of the cutting tool in one thread groove on the workpiece, seen from the Z-axis directions, after having undergone cutting-in processes for a first time and a second time. Although, in FIG. 4, shapes of the cutting-in processes for the first time and the second time are shown, cutting-in processes are actually repeated, similar to the cutting-in processes for the first time and the second time, until a path in one thread groove renders a circle having a set diameter. Auxiliary circles in FIG. 4 respectively show a circumference of the workpiece 104 and a maximum machining depth at which machining is performed in the cutting-in process for the first time. A cutting-in process count is to be set depending on how many times cutting-in processes take place to perform thread cutting. As the cutting tool 110 machines the workpiece 104, the shapes of the cutting-in processes for the first time and the second time, shown in FIG. 4, are formed.

As a motor that causes the workpiece 104 to move in the feed direction along the Z axis and to vibrate in the Z-axis directions and motors that cause the cutting tool 110 to vibrate in directions along an X-axis and a Y-axis, servomotors coupled to a ball screw may be used, instead of the linear servomotor 101, the linear servomotor 108, and the linear servomotor 105.

Next, the numerical controller 200 will be described. The numerical controller 200 includes, as shown in FIG. 1, an analysis processing unit 201, an interpolation processing unit 202, an acceleration-deceleration processing unit 203, a control command outputting unit 204, and a driver 205. The interpolation processing unit 202 includes a vibration superimposing unit 2021 and a vibration adjusting unit 2022. The analysis processing unit 201 analyzes a machining program including one or more blocks, per block, reads a movement route and a feed speed, generates a movement command, and outputs the generated movement command to the interpolation processing unit 202. The analysis processing unit 201 further reads a vibration command from the machining program, generates vibration conditions, and outputs the generated vibration conditions to the interpolation processing unit 202.

In the interpolation processing unit 202, the vibration superimposing unit 2021 calculates a command moving amount by which the movement command is used and movement at the specified feed speed takes place during a processing cycle representing a cycle of control by the numerical controller 200, calculates a vibration moving amount to be applied during the processing cycle for causing, by using the vibration command, the cutting tool 110 and the workpiece 104 to vibrate, and, further, calculates a superimposed moving amount that the vibration moving amount is superimposed on the command moving amount. Specifically, the vibration superimposing unit 2021 calculates the superimposed moving amount by which vibration where two axes that are the X axis and the Z axis among three drive axes that are the X axis, the Y axis, and the Z axis or the three axes that are the X axis, the Y axis, and the Z axis are synchronized with each other is to be superimposed on relative movement between the cutting tool 110 and the workpiece 104. By allowing the two axes that are the X axis and the Z axis to vibrate, or by allowing the three axes that are the X axis, the Y axis, and the Z axis to vibrate, it is possible to suppress core misalignment from occurring due to relative vibration between a cutting tool and a workpiece, to improve accuracy of a finished shape, and to suppress a tip of the cutting tool from being influenced. For example, as shown in FIG. 1, in a case where vibration represents only vibration along the X axis in radial directions of the workpiece 104, forces are applied in parallel to the radial directions of the workpiece. However, by allowing vibration to occur along the X axis and the Y axis or the Z axis, or along the X axis, the Y axis, and the Z axis to allow vibration to occur in the thread groove directions, as shown in FIG. 2, it is possible to allow forces heading in the radial directions of the workpiece to be dispersed, suppressing core misalignment from occurring.

The vibration adjusting unit 2022 causes, in each of cutting-in processes to be performed a plurality of times, a phase of vibration to shift relative to a phase of a spindle by a vibration phase shift amount set beforehand. For example, the vibration adjusting unit 2022 sets a phase of vibration in a cutting-in process for a second time, opposite in relationship to a phase of vibration in a cutting-in process for a first time to allow vibration to occur so that, even though the cutting-in process has started upon start of backward movement of vibration in the cutting-in process for the first time, the cutting-in process starts upon start of forward movement of vibration in the cutting-in process for the second time. In here, backward movement of vibration refers to behavior that the tip end of the cutting tool 110 is moved toward the outer peripheral surface of the workpiece 104. Meanwhile, forward movement of vibration refers to behavior that the tip end of the cutting tool 110 is moved away from the outer peripheral surface of the workpiece 104. The operation of the vibration adjusting unit 2022 will be described later in detail.

The acceleration-deceleration processing unit 203 converts, in accordance with an acceleration-deceleration pattern specified beforehand, each of the superimposed moving amounts for the respective drive axes, which have been output from the interpolation processing unit 202, and in which a vibration phase shift amount has been adjusted, into a movement command per processing cycle, to which acceleration and deceleration have been taken into account.

The control command outputting unit 204 outputs, to the driver 205, as a control command, the movement command output from the acceleration-deceleration processing unit 203. The driver 205 controls, in accordance with the control command, the spindle that rotates the workpiece 104, and the three axes that are the Z axis along which the workpiece 104 is caused to move and vibrate and the X axis and the Y axis along which the cutting tool 110 is caused to vibrate. The driver 205 includes a spindle control unit that controls the spindle motor 103 that rotates the workpiece 104, and a Z-axis servo control unit that controls the linear servomotor 101 that causes the workpiece 104 to move and vibrate in the feed direction along the Z axis. The driver 205 further includes an X-axis servo control unit that controls the linear servomotor 108 that causes the cutting tool 110 to vibrate in the X-axis directions, and a Y-axis servo control unit that controls the linear servomotor 105 that causes the cutting tool 110 to vibrate in the Y-axis directions. Since the control units are already known, illustration and description thereof are omitted.

The functional blocks included in the numerical controller 200 have been described above. To achieve the functional blocks, the numerical controller 200 includes an arithmetic processing unit such as a central processing unit (CPU). The numerical controller 200 further includes an auxiliary storage such as a hard disk drive (HDD) that stores programs for various types of control, including application software and an operating system (OS), and a main storage such as a random access memory (RAM) that stores data that the arithmetic processing unit temporarily requires to execute the programs.

In the numerical controller 200, the arithmetic processing unit then reads the application software and the OS from the auxiliary storage, deploys the read application software and the OS into the main storage, and performs arithmetic processing on the basis of the application software and the OS. On the basis of a result of the arithmetic processing, various types of hardware included in the devices are further controlled. Therefore, the functional blocks according to the embodiment are achieved. That is, the embodiment can be achieved when the hardware and the software cooperate with each other.

In a case where the numerical controller 200 is expected to perform a greater amount of arithmetic processing, for example, a graphics processing unit (GPU) may be mounted on a personal computer, and a technique called general-purpose computing on graphics processing units (GPGPU) may be used to utilize the GPU in arithmetic processing, since this can achieve prompt processing. Furthermore, to perform more prompt processing, a plurality of computers each mounted with such a GPU as described above may be used to build a computer cluster to allow the plurality of computers included in the computer cluster to perform parallel processing.

Next, operation of a cutting-in process for a first time and a cutting-in process for a second time will be described herein with reference to FIGS. 5 to 16. In FIGS. 5 to 16, the cutting tool 110 is shown as a triangle for the purpose of simplification. FIGS. 5 to 9 are conceptual diagrams each showing a path of the cutting tool in a thread groove on the workpiece, seen from the Z-axis directions during the cutting-in process for the first time. Note that, although only vibration of the cutting tool in the X-axis directions and the Y-axis directions is shown in FIGS. 5 to 9, the cutting tool is also vibrated in the Z-axis directions, as shown in FIG. 2. Note that, in subsequent operation, chips are cut at a portion where the cutting tool 110 reaches the outer peripheral surface during backward movement.

Figure 5:
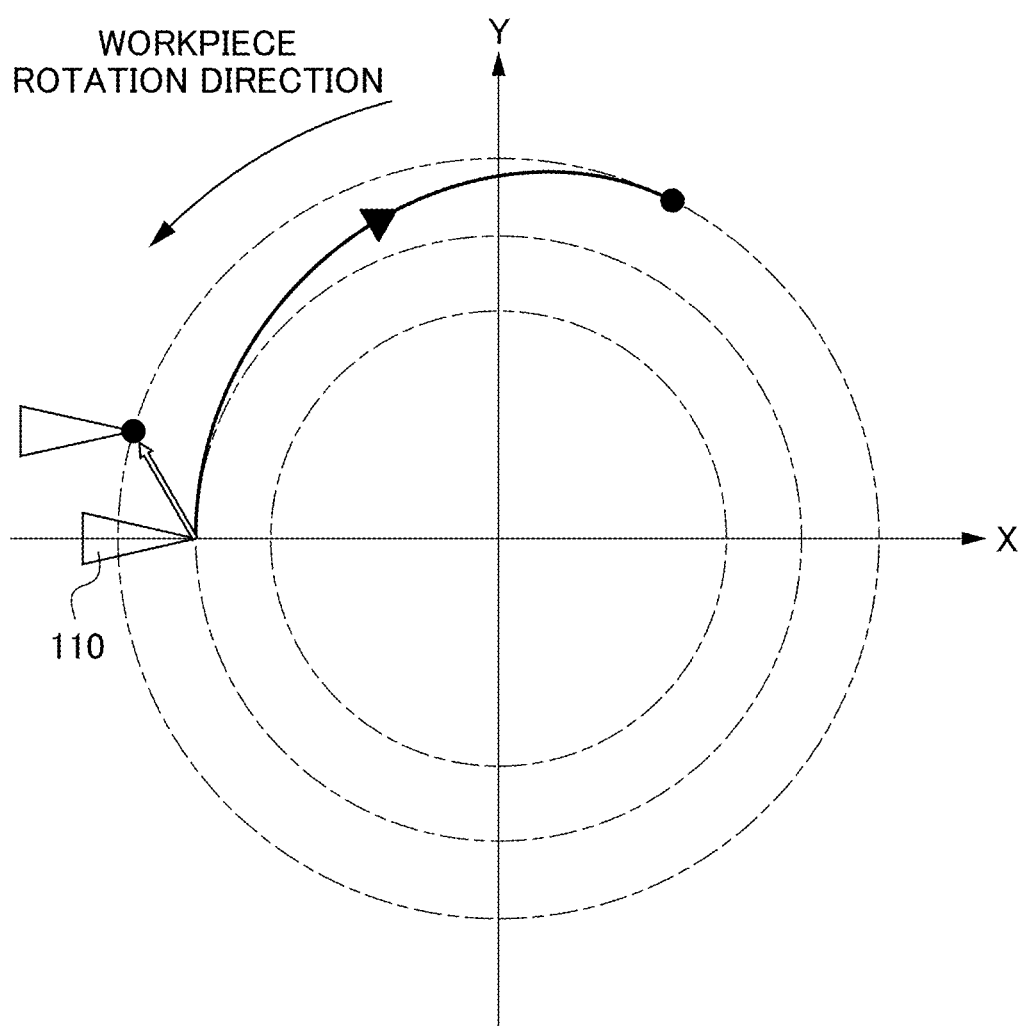
FIG. 5 is a conceptual diagram showing the path of the cutting tool in the thread groove on the workpiece, seen from the Z-axis directions, during the cutting-in process for the first time.
Figure 6:
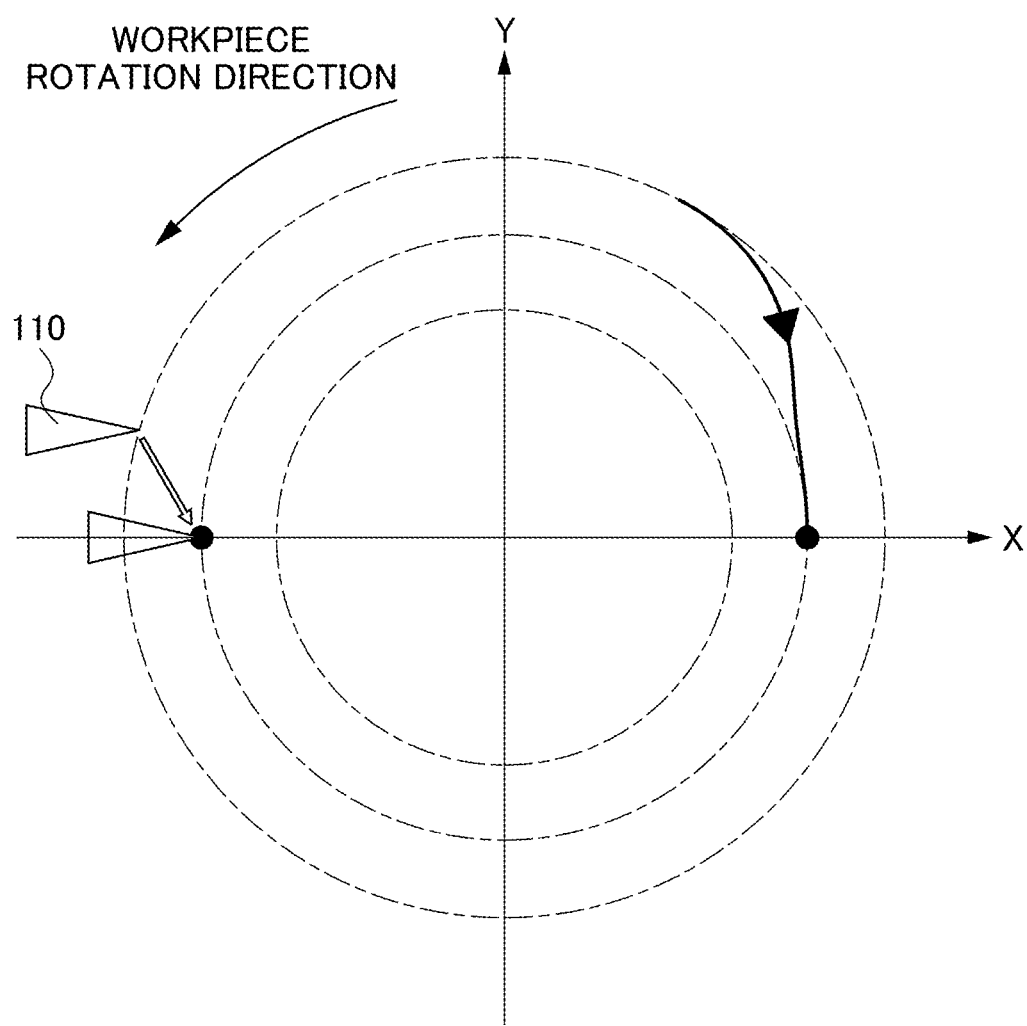
FIG. 6 is a conceptual diagram showing the path of the cutting tool in the thread groove on the workpiece, seen from the Z-axis directions, during the cutting-in process for the first time.
Figure 7:
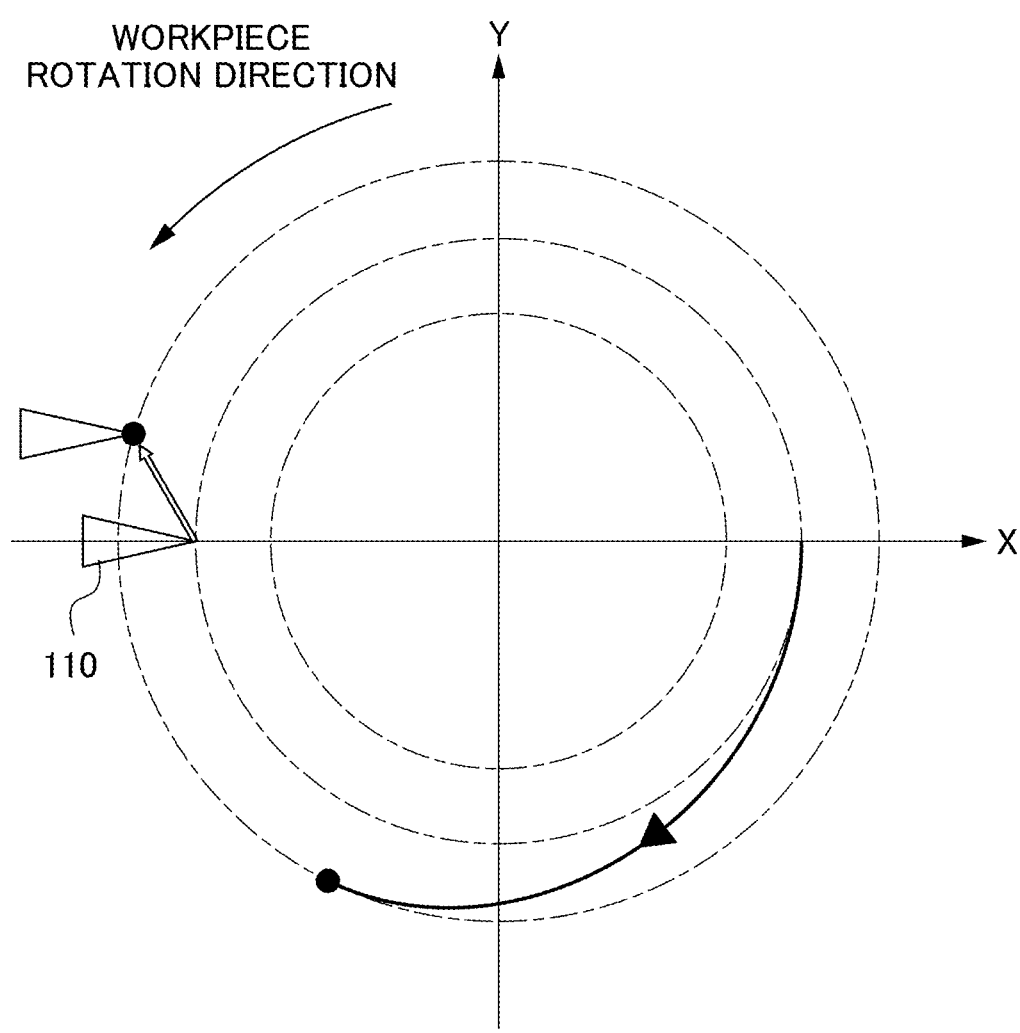
FIG. 7 is a conceptual diagram showing the path of the cutting tool in the thread groove on the workpiece, seen from the Z-axis directions, during the cutting-in process for the first time.

In the cutting-in process for the first time, as shown in FIG. 5, the cutting tool 110 is caused to vibrate so that the cutting-in process starts upon start of backward movement of vibration. During the backward movement of the cutting tool 110, the tip end of the cutting tool 110 reaches the outer peripheral surface of the workpiece 104. The workpiece 104 undergoes the cutting-in process by the cutting tool 110, from its tip end. Next, after the cutting tool 110 has been caused to move forward, as shown in FIG. 6, the cutting tool 110 is caused to move backward, as shown in FIG. 7.

Figure 8:
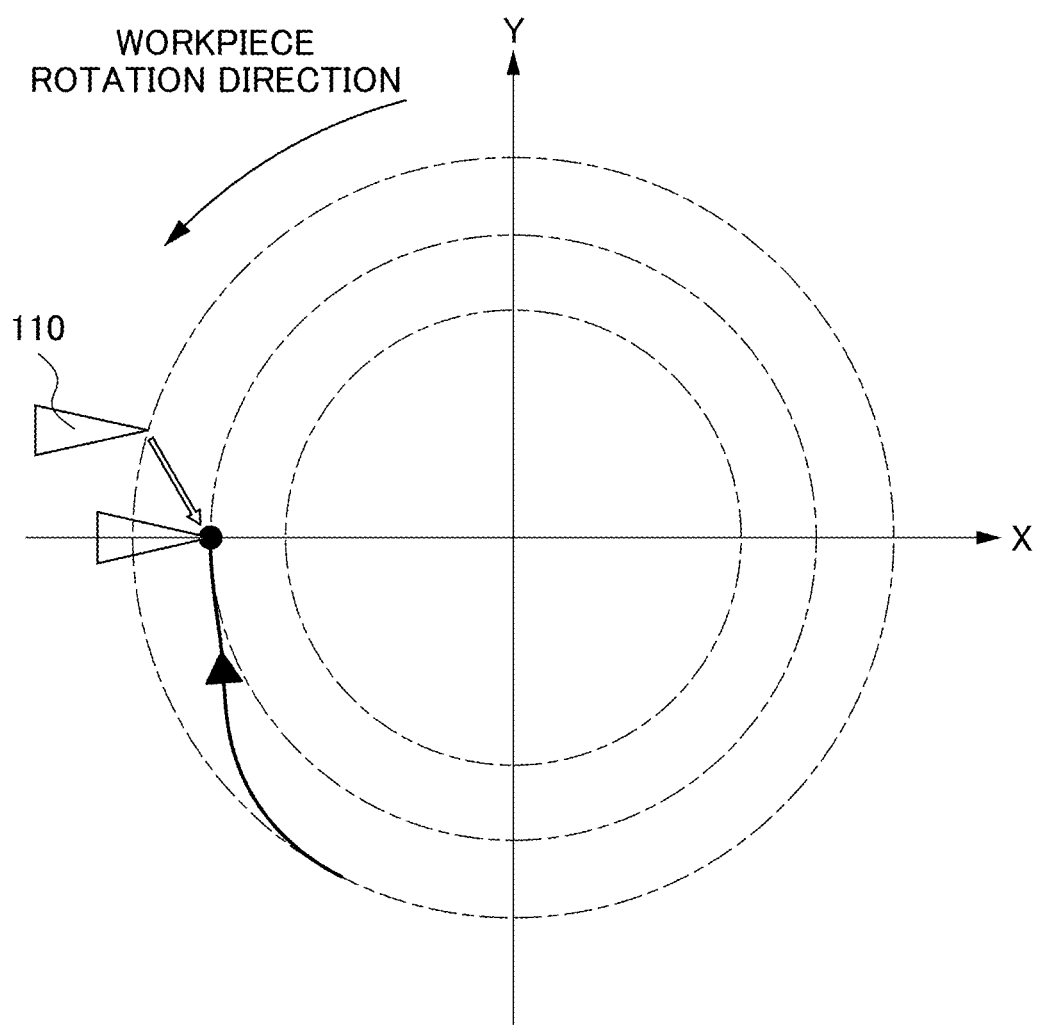
FIG. 8 is a conceptual diagram showing the path of the cutting tool in the thread groove on the workpiece, seen from the Z-axis directions, during the cutting-in process for the first time.
Figure 9:
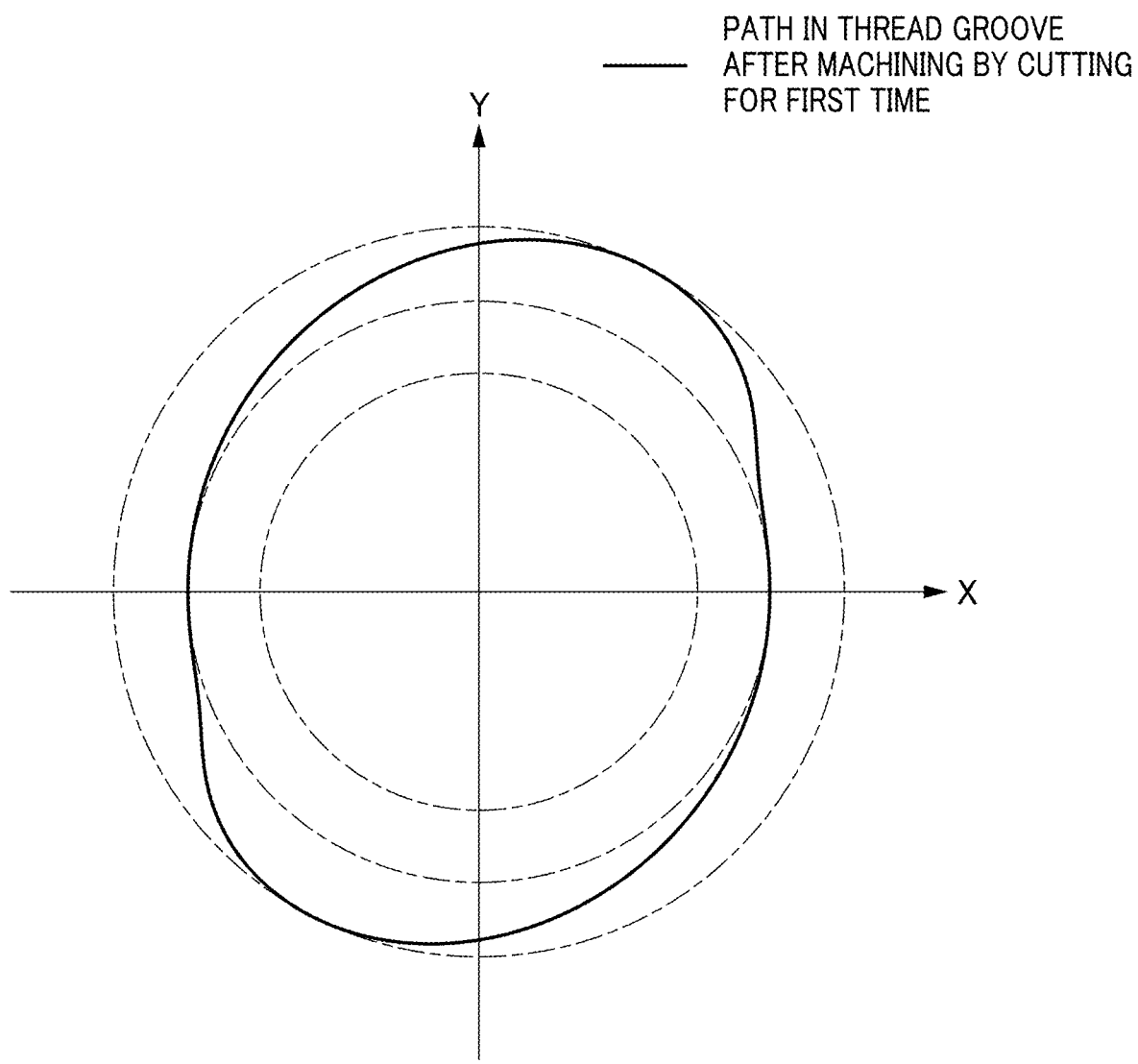
FIG. 9 is a conceptual diagram showing the path of the cutting tool in the thread groove on the workpiece, seen from the Z-axis directions, during the cutting-in process for the first time.

Furthermore, as shown in FIG. 8, the cutting tool 110 is caused to move forward. Therefore, a path of the cutting tool in one thread groove shown in FIG. 9 is acquired. Although, in FIGS. 5 to 9, the path of the cutting tool in one thread groove on the workpiece 104 during one turn is shown, a rotation number of the workpiece 104 is determined in accordance with a length of a part onto which a thread groove is to be formed. Thus, in the cutting-in process for the first time, as the workpiece 104 is rotated the determined rotation number, a thread groove is helically formed.

Next, in the cutting-in process for the second time, a phase of vibration is shifted relative to a phase of the spindle by a vibration phase shift amount set beforehand. In the embodiment, specifically, the vibration adjusting unit 2022 sets the phase of vibration in the cutting-in process for the second time, opposite in relationship to the phase of vibration in the cutting-in process for the first time to allow vibration to occur so that, even though the cutting-in process has started upon start of backward movement of vibration in the cutting-in process for the first time, the cutting-in process starts upon start of forward movement of vibration in the cutting-in process for the second time. Then, a path of the cutting tool 110 during backward movement in the cutting-in process for the second time is to be allowed to reach a position on the path of the cutting tool 110, at which the forward movement has been switched to the backward movement in the cutting-in process for the first time.

Figure 10:
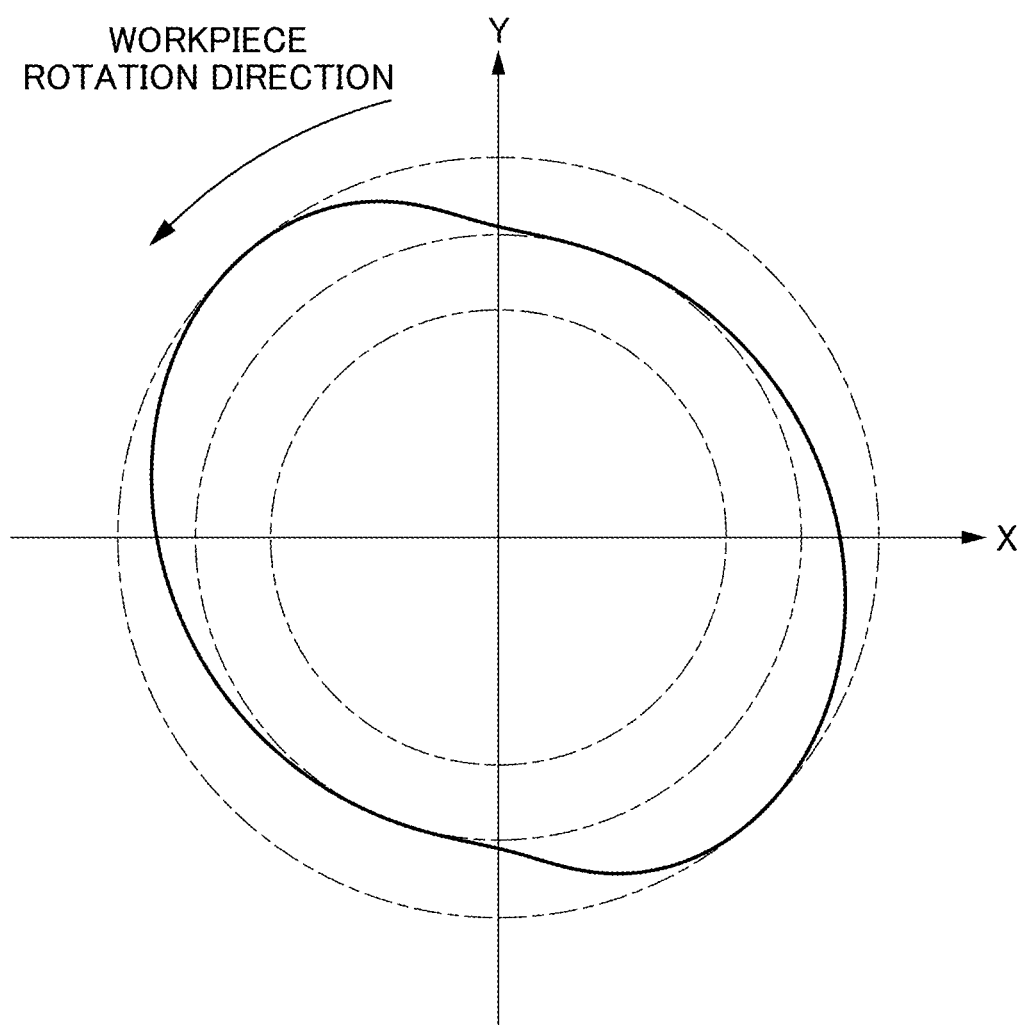
FIG. 10 is a conceptual diagram showing rotation of the workpiece where no cutting-in process takes place on the workpiece, seen from the Z-axis directions, during the cutting-in process for the second time.
Figure 11:
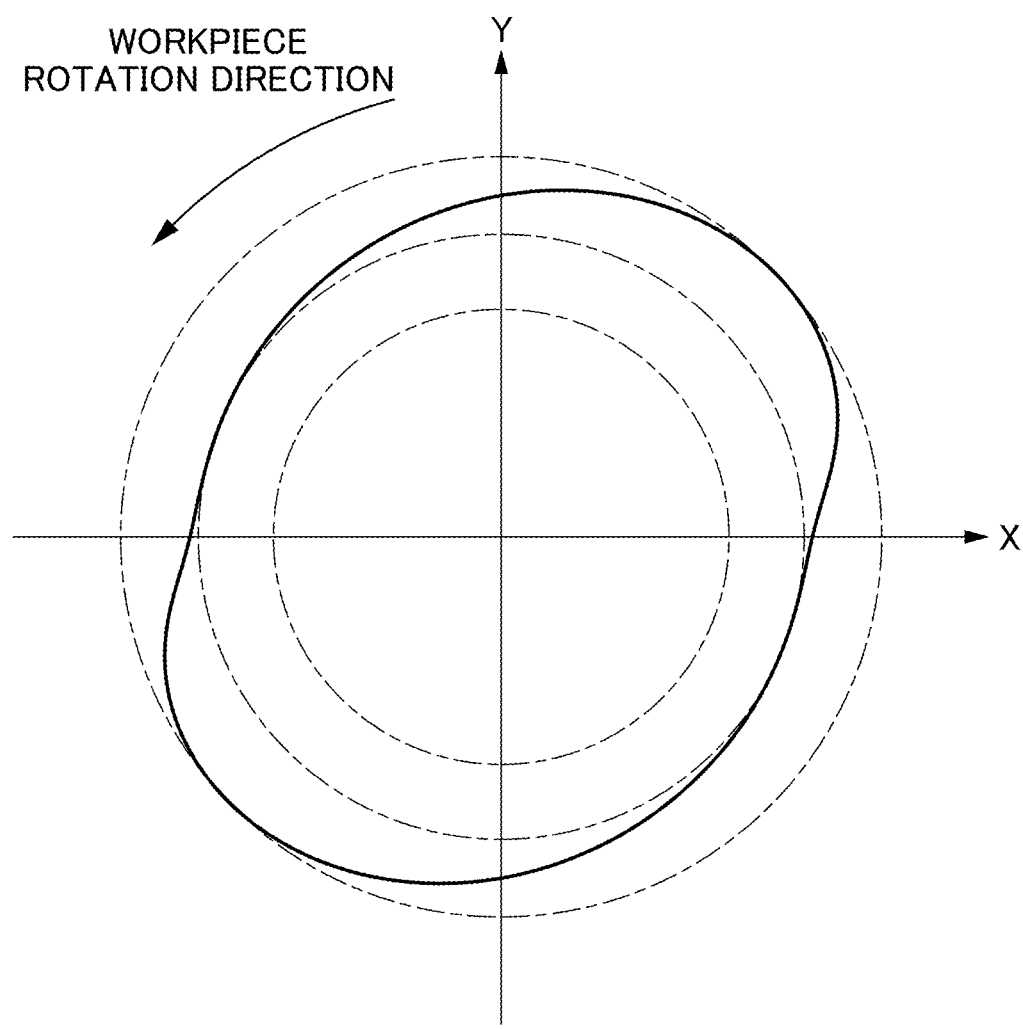
FIG. 11 is a conceptual diagram showing the rotation of the workpiece where no cutting-in process takes place on the workpiece, seen from the Z-axis directions, during the cutting-in process for the second time.

In the cutting-in process for the second time, the workpiece 104 is rotated, as shown in FIG. 10, from the path in the thread groove in FIG. 9. The workpiece 104 is then further rotated a half turn to a path in the thread groove in FIG. 11. A purpose of the rotation operation where no cutting-in process takes place is to cause a phase during cutting in the cutting-in process for the second time to change relative to the phase during cutting in the cutting-in process for the first time, as well as to cause a starting position of a path of the cutting tool 110 during forward movement in the cutting-in process for the second time to reach a predetermined position on the path of the cutting tool 110 in the cutting-in process for the first time.

Figure 12:
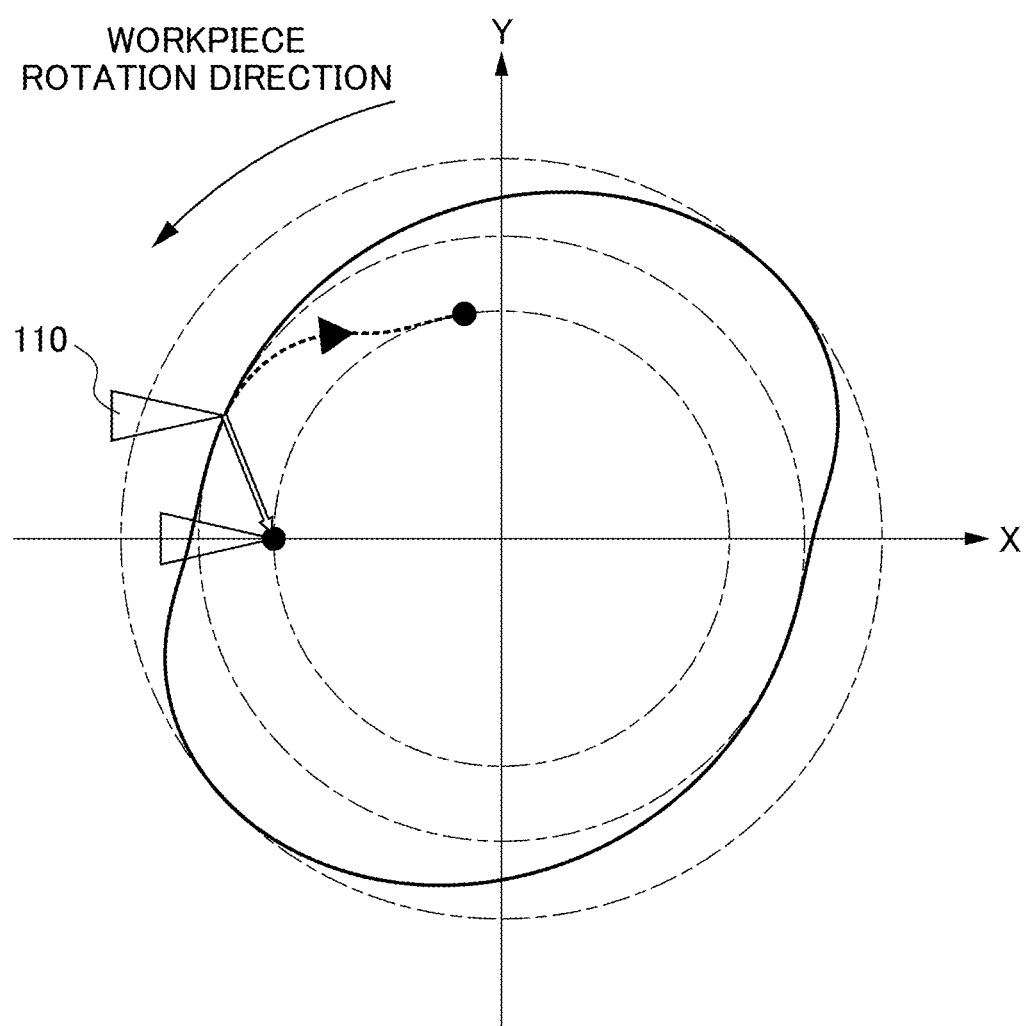
FIG. 12 is a conceptual diagram showing the path of the cutting tool in the thread groove on the workpiece, seen from the Z-axis directions, during the cutting-in process for the second time.
Figure 13:
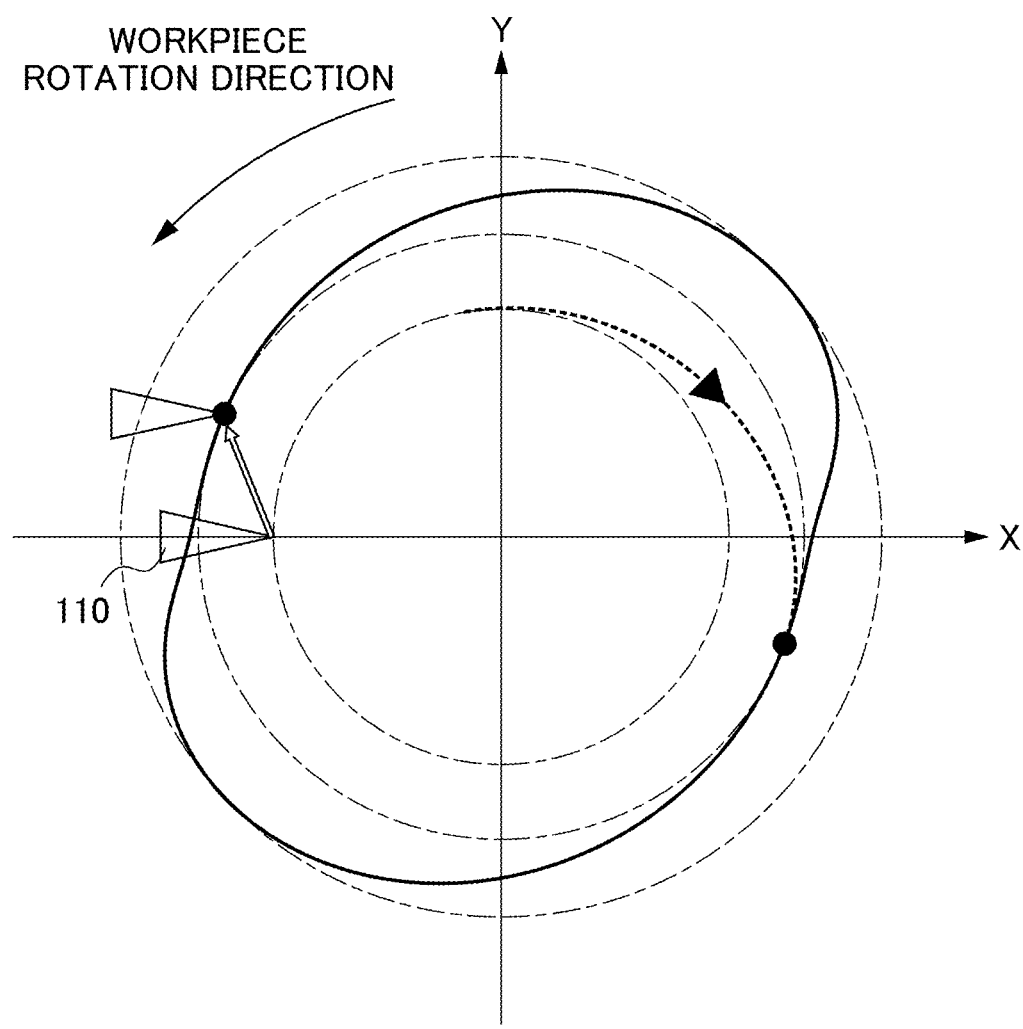
FIG. 13 is a conceptual diagram showing the path of the cutting tool in the thread groove on the workpiece, seen from the Z-axis directions, during the cutting-in process for the second time.
Figure 14:
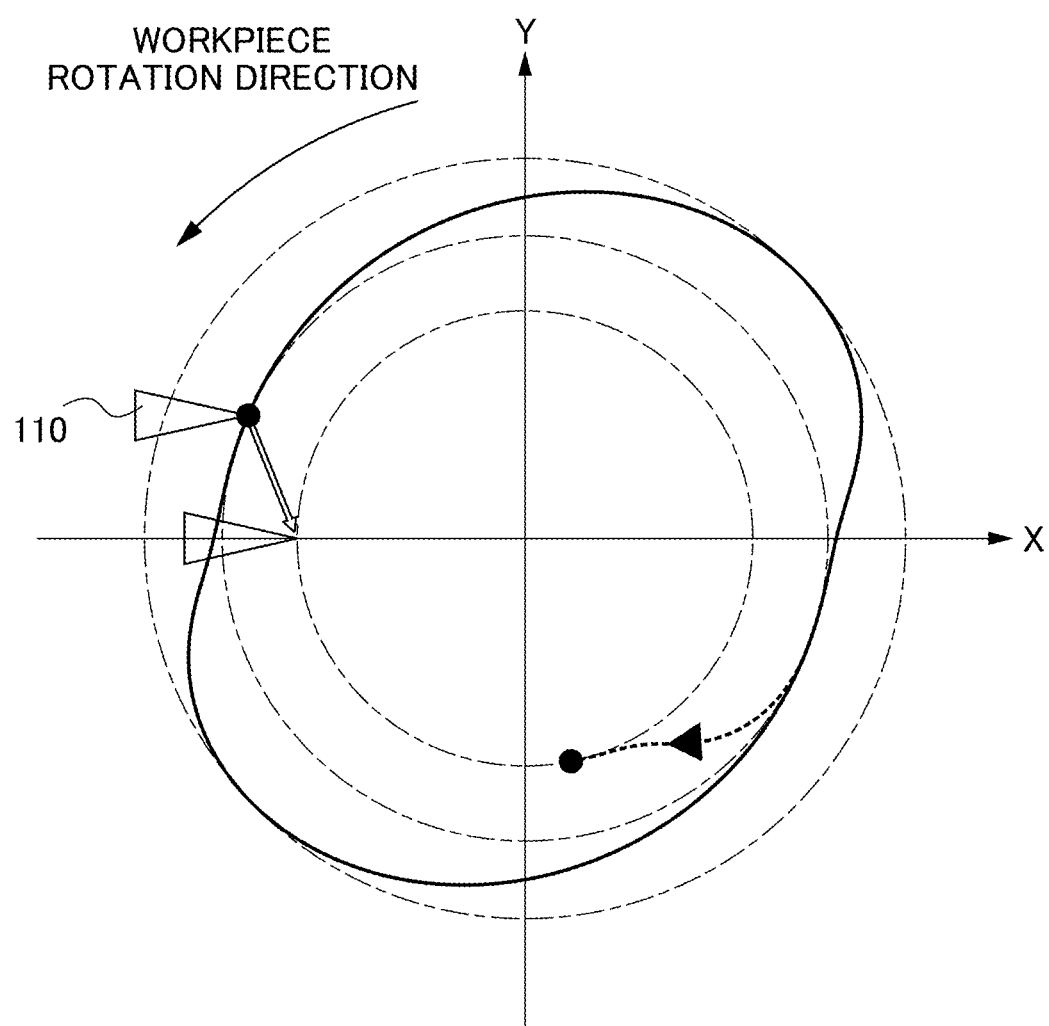
FIG. 14 is a conceptual diagram showing the path of the cutting tool in the thread groove on the workpiece, seen from the Z-axis directions, during the cutting-in process for the second time.
Figure 15:
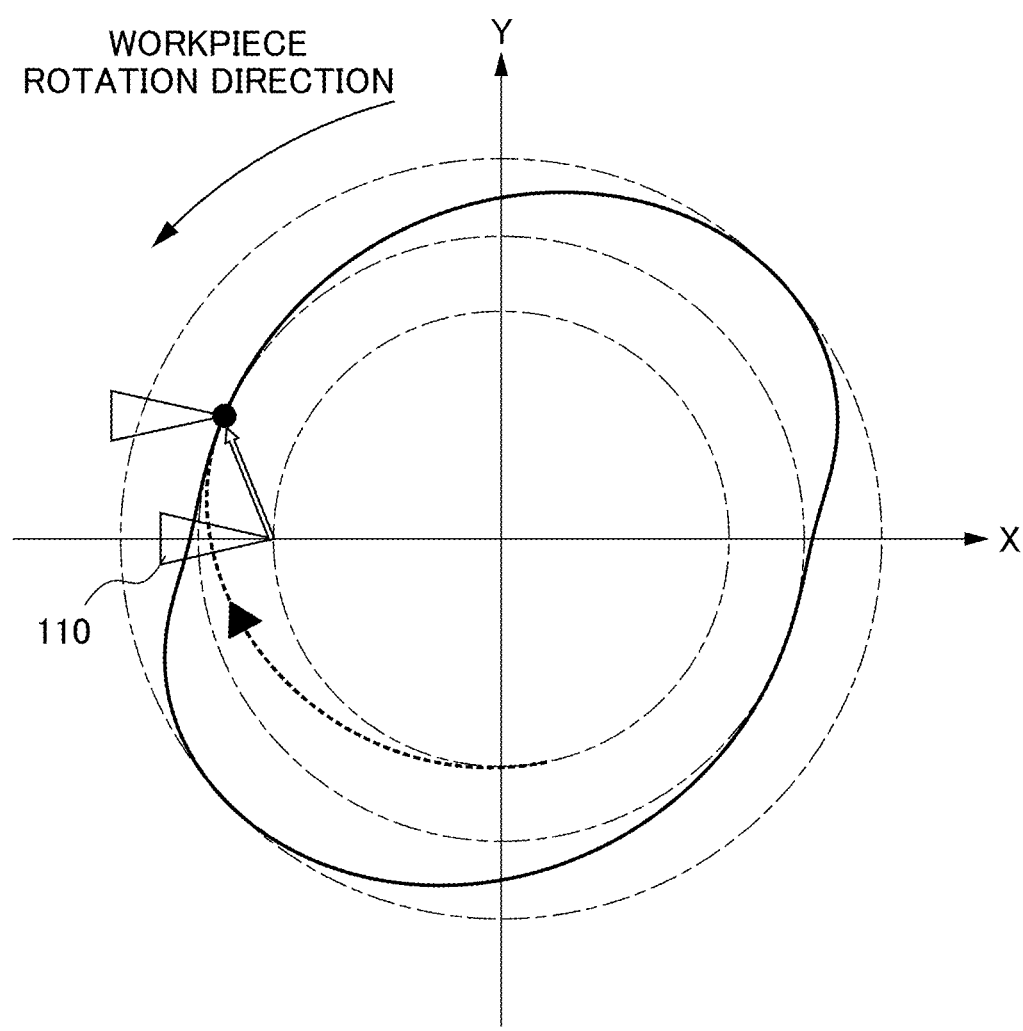
FIG. 15 is a conceptual diagram showing the path of the cutting tool in the thread groove on the workpiece, seen from the Z-axis directions, during the cutting-in process for the second time.
Figure 16:
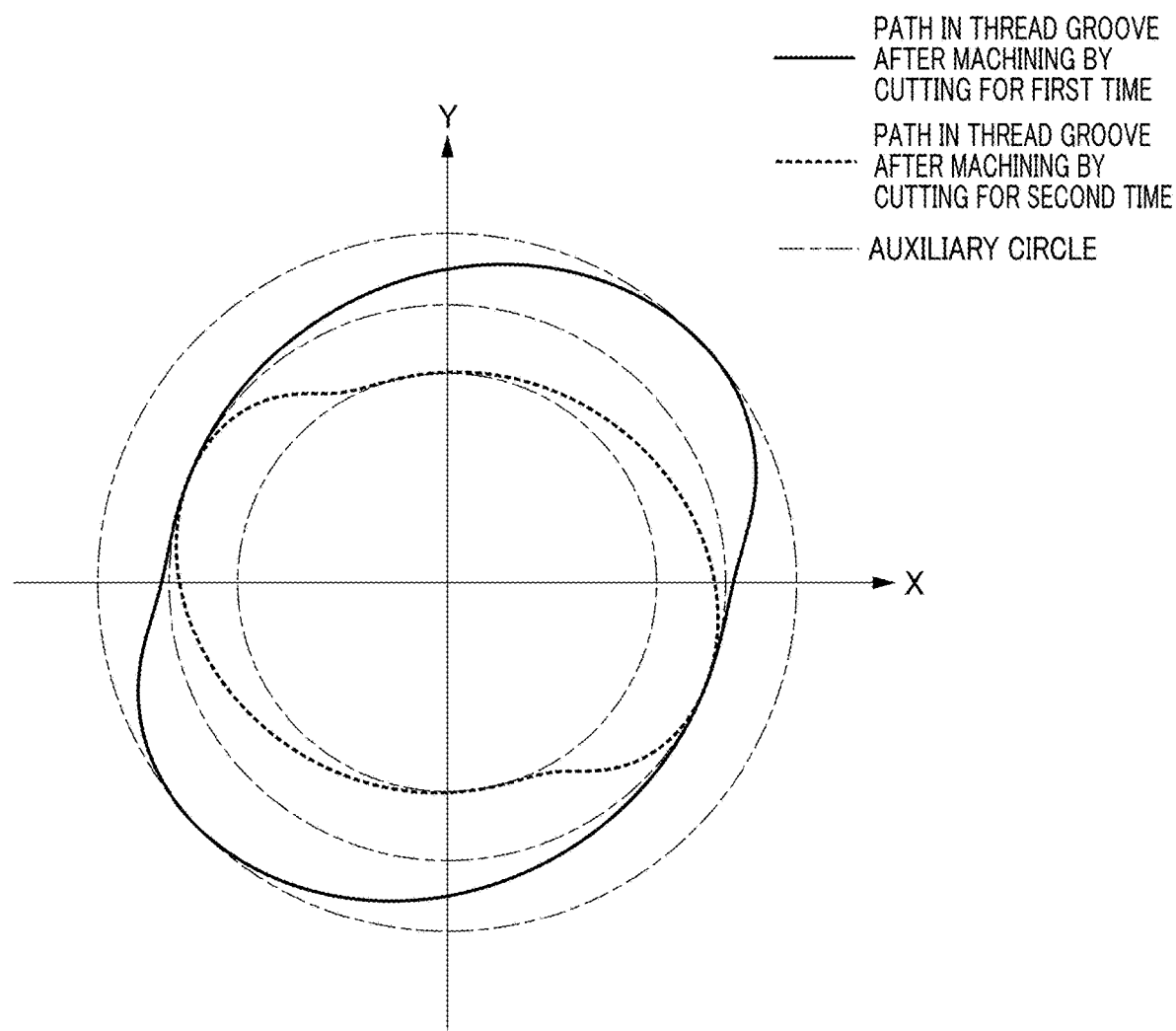
FIG. 16 is a conceptual diagram showing the paths of the cutting tool in one thread groove on the workpiece, seen from the Z-axis directions, during the cutting-in processes for the first time and the second time.
Figure 17:
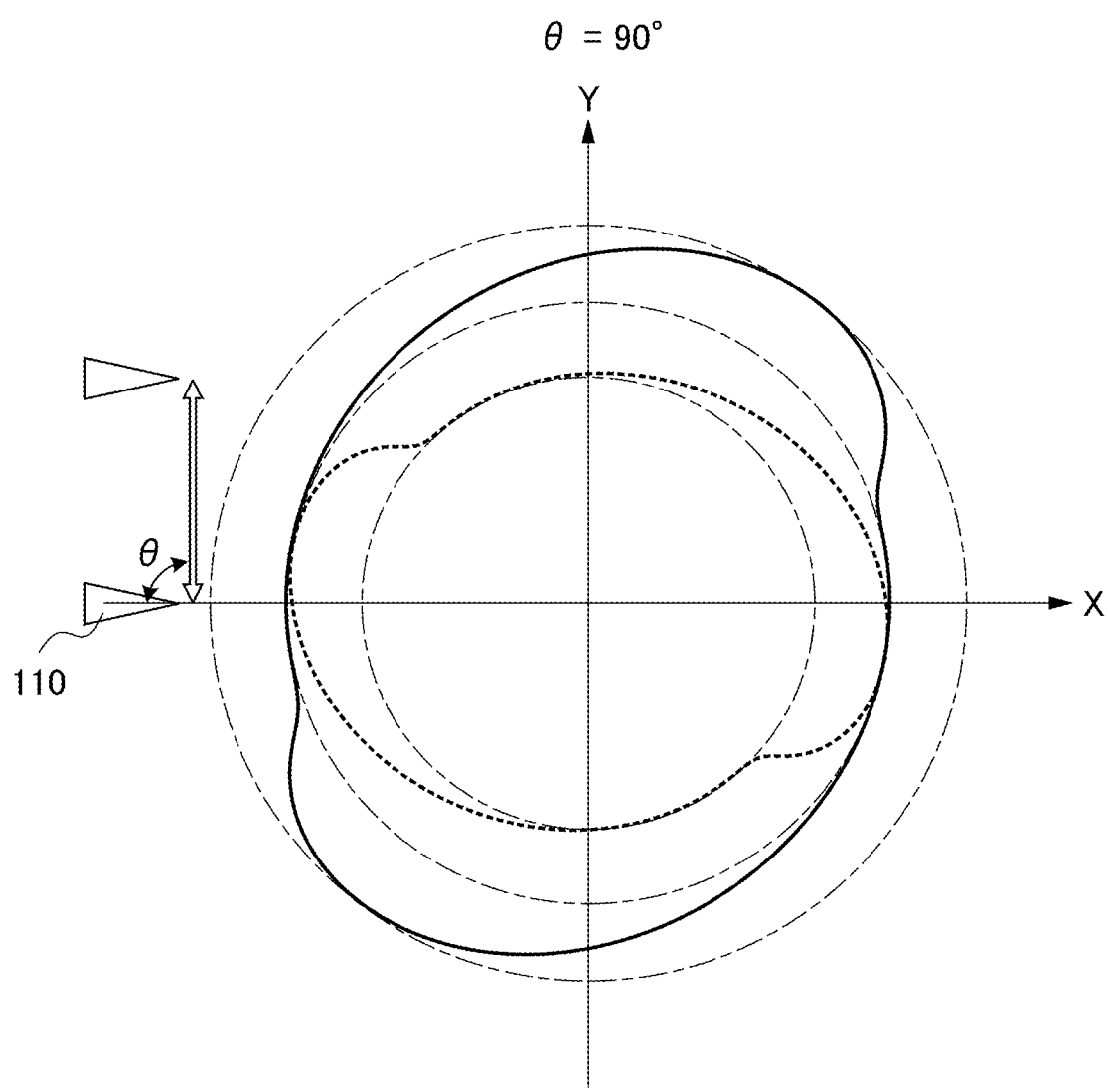
FIG. 17 is a conceptual diagram showing paths in one thread groove, after having undergone cutting-in processes for a first time and a second time, when a cutting angle θ is 90°.
Figure 18:
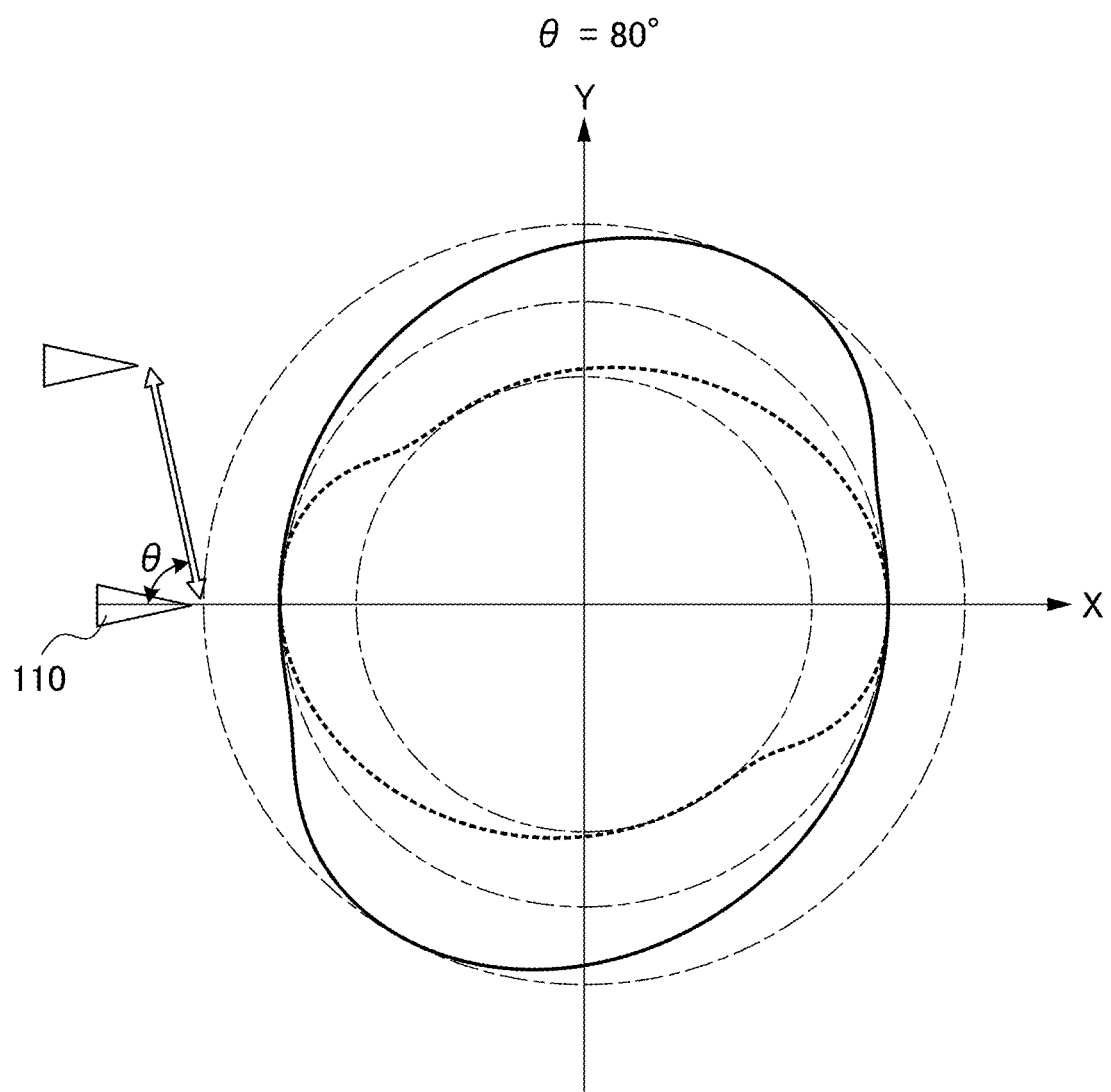
FIG. 18 is a conceptual diagram showing paths in one thread groove, after having undergone cutting-in processes for a first time and a second time, when a cutting angle θ is 80°.
Figure 19:
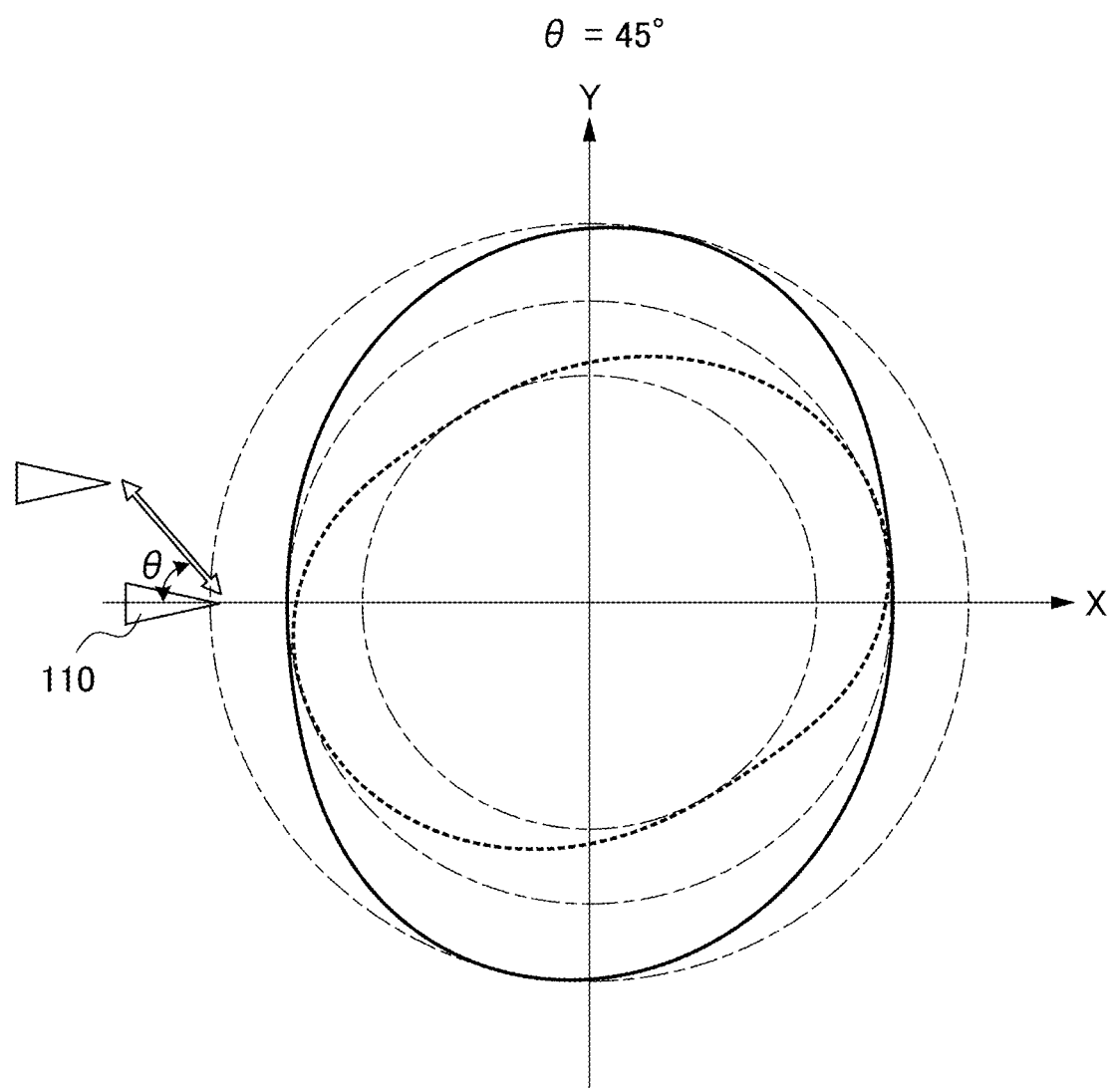
FIG. 19 is a conceptual diagram showing paths in one thread groove, after having undergone cutting-in processes for a first time and a second time, when a cutting angle θ is 45°.

After that, as shown in FIG. 12, the cutting tool 110 is caused to vibrate so that a cutting-in process starts upon start of forward movement of vibration. Note that, in subsequent operation, chips are cut at a portion where the cutting tool 110 reaches the outer peripheral surface during backward movement. Next, after the cutting tool 110 has been caused to move backward, as shown in FIG. 13, the cutting tool 110 is caused to move forward, as shown in FIG. 14. Furthermore, as shown in FIG. 15, the cutting tool 110 is caused to move backward. Therefore, a path of the cutting tool in one thread groove shown in FIG. 16 is acquired. Then, even in the cutting-in process for the second time, similar to the cutting-in process for the first time, as the workpiece 104 is rotated the determined rotation number, a thread groove is helically formed.

In a subsequent cutting-in process for a third time, similar to the cutting-in process for the second time, no cutting-in process takes place, but the workpiece 104 is rotated a half turn. A purpose of the rotation operation where no cutting-in process takes place is to cause a phase during cutting in the cutting-in process for the third time to change relative to the phase during cutting in the cutting-in process for the second time, as well as to cause a starting position of a path of the cutting tool 110 during the forward movement in the cutting-in process for the third time to reach a predetermined position on the path of the cutting tool 110 in the cutting-in process for the second time. With the rotation operation where no cutting-in process takes place in the cutting-in process for the third time, the starting position of the path of the cutting tool 110 for the third time returns to the starting position of the path of the cutting tool 110 for the first time. The vibration adjusting unit 2022 sets the phase of vibration in the cutting-in process for the third time, opposite in relationship to the phase of vibration in the cutting-in process for the second time.

Although, in FIG. 16, shapes of the cutting-in processes for the first time and the second time are shown, cutting-in processes actually take place, until a path in one thread groove renders a circle having a set diameter. A cutting-in process count is to be set depending on how many times cutting-in processes take place to perform thread cutting.

<Relationship Between Cutting Angle and Cutting Route>

Figure 20:
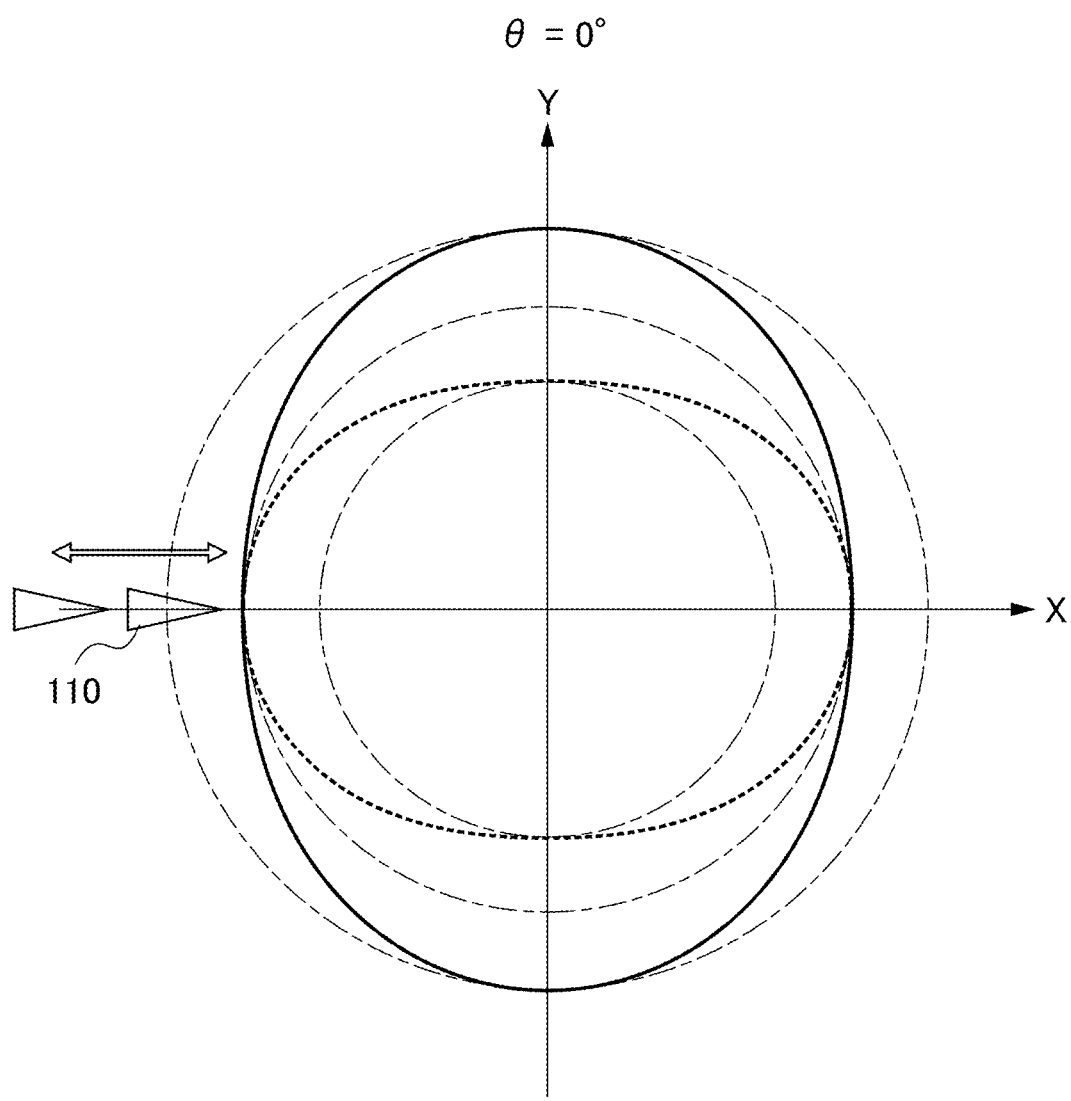
FIG. 20 is a conceptual diagram showing paths in one thread groove, after having undergone cutting-in processes for a first time and a second time, when a cutting angle θ is 0°.

Although, as described above, the angle θ (hereinafter referred to as the cutting angle θ) between the X-axis directions and the vibration directions along the Y axis of the cutting tool has been described as fixed to be constant, the cutting angle θ can be set to a desired value falling within a range of 0°≤θ≤90° inclusive. FIGS. 17 to 20, respectively, are conceptual diagrams each showing a path (cutting route) in one thread groove after having undergone cutting-in processes for a first time and a second time, when the cutting angle θ varies to 90°, 80°, 450, and 0°. Note that, although vibration along the Z axis is not shown in FIGS. 17 to 20, a cutting tool is actually vibrating in also the Z-axis directions relative to the workpiece 104. When the cutting angle θ is 0°, the cutting tool is not vibrated in the Y-axis directions, but is vibrated along two axes, i.e., is vibrated in the X-axis directions and the Z-axis directions. Shapes of the cutting routes vary depending on the cutting angle θ, as shown in FIGS. 17 to 20. When the cutting angle 9 is 0°, the cutting route forms an ellipse, as shown in FIG. 20. As the cutting angle θ increases, forces to be applied in the radial directions of the workpiece 104 can be dispersed in directions other than the radial directions of the workpiece, reducing the forces to be applied in the radial directions of the workpiece 104. However, as shown in FIGS. 17 to 20, as the cutting angle θ increases, the paths of the cutting tool become non-uniform, as well as changes in cutting load become non-uniform. Thus, the cutting angle θ is adjusted in accordance with machining conditions for thread cutting.

The components included in the numerical controller 200 described above can be achieved through hardware, software, or combinations thereof. A numerical control method to be performed through cooperation with each of the components included in the numerical controller 200 described above can also be achieved through hardware, software, or combinations thereof. In here, achievement through software means achievement when a computer reads and executes a program.

The programs can be stored by using one of various types of non-transitory computer readable media (non-transitory computer readable media), and can be supplied to a computer. The non-transitory computer readable media include various types of substantial recording media (tangible storage media). Examples of the non-transitory computer readable media include magnetic recording media (for example, hard disk drives), magneto-optical recording media (for example, magneto-optical discs), compact disc read only memories (CD-ROMs), compact discs-recordable (CD-Rs), compact discs-rewritable (CD-R/Ws), semiconductor memories (for example, mask ROMs, programmable ROMs (PROMs), erasable PROMs (EPROMs), flash ROMs, and random access memories (RAMs)).

Although the foregoing embodiment represents a preferable embodiment of the present invention, the scope of the present invention should not be limited to only the embodiment described above. Embodiments that have been variously changed without departing from the gist of the present invention are also implementable. For example, although, in the foregoing embodiment, a path of the cutting tool 110 during backward movement in a cutting-in process for a second time has been caused to reach a position on a path of the cutting tool 110, at which forward movement has been switched to backward movement in a cutting-in process for a first time, a path of the cutting tool 110 during backward movement in a cutting-in process for a second time may exceed a position on a path of the cutting tool 110, at which forward movement is to be switched to backward movement in a cutting-in process for a first time.

Furthermore, in the foregoing embodiment, a vibration number for the cutting tool 110 is fixed in cutting-in processes for a first time and a second time. As an example, such a case has been described where the cutting tool 110 is caused to vibrate twice in the X-axis directions in proportion to one turn of a workpiece. However, in cutting-in processes for a first time and a second time, frequency of vibration may be changed. For example, in a cutting-in process for a first time, the cutting tool 110 may be caused to vibrate once in proportion to eight turns of a spindle. Meanwhile, in a cutting-in process for a second time, the cutting tool 110 may be caused to vibrate once in proportion to four turns of the spindle. This may be similarly applied to a third time and onward. Each time a cutting-in process has taken place, frequency of vibration may be increased. Therefore, each time a cutting-in process has taken place, frequency is gradually increased, making finer unevenness on a bottom surface of a thread on the workpiece 104 through thread cutting.

Furthermore, in the foregoing embodiment, an amount of amplitude of vibration and a cutting amount during a cutting-in process have been made to coincide with each other so that cutting-in processed portions having consecutively undergone two cutting-in processes are in contact with each other. However, an amount of amplitude of vibration can be set in accordance with, for example, a ratio of a cutting amount by an actual cutting tool with respect to a workpiece (a ratio between amplitude and cutting). An amount of amplitude may be set greater than a cutting amount. For example, an amount of amplitude can be set greater than a cutting amount by setting a ratio between amplitude and cutting to a value above 1 so as to allow a path of the cutting tool 110 during backward movement in a cutting-in process for a second time to exceed a position on a path of the cutting tool 110, at which forward movement is to be switched to backward movement in a cutting-in process for a first time.

Furthermore, although, in the foregoing embodiment, a cutting amount in each cutting-in process has been set to an identical value, the cutting amount may be controlled so that, each time a cutting-in process has taken place, the cutting amount decreases. Therefore, each time a cutting-in process has taken place, unevenness on a bottom surface of a thread on the workpiece 104 gradually becomes smaller. An amount of amplitude of vibration during a cutting-in process can be set and controlled in accordance with a cutting amount so that, each time a cutting-in process has taken place, the amount of the amplitude decreases.

Furthermore, in the foregoing embodiment, as movement and vibration in the feed direction along the Z axis of the workpiece 104 being rotated cooperate with vibration in the X-axis directions and the Y-axis directions of the cutting tool 110, the cutting tool 110 performs thread cutting on the workpiece 104. However, vibration in the X-axis directions and the Y-axis directions may be applied to the workpiece 104. The cutting tool 110 may also be moved in an opposite direction to the feed direction shown in FIG. 1, instead of causing the workpiece 104 to move in the feed direction. Furthermore, a motor such as a linear motor that causes, without causing the workpiece 104 to vibrate in the Z-axis directions, the cutting tool 110 to vibrate may be provided to allow the cutting tool 110 to vibrate in the Z-axis directions.

The numerical controller, the machine tool system, and the numerical control method according to the present disclosure can take, including the foregoing embodiment, various types and kinds of embodiments having configurations described below.

(1) A first aspect of the present disclosure is a numerical controller (for example, the numerical controller 200) that causes a machine tool (for example, the machine tool 100) to perform an operation for performing thread cutting through which a cutting tool and a machining target are allowed to move relative to each other to perform cutting-in processes a plurality of times on the machining target to form a thread on the machining target, the numerical controller including: a driver (for example, the driver 205) that controls a spindle that rotates the machining target, and drive axes having three axes;
a vibration superimposing unit (for example, the vibration superimposing unit 2021) that superimposes vibration to be applied to two axes or more among the three axes on the relative movement between the cutting tool and the machining target so that the cutting tool and the machining target vibrate relative to each other along a thread groove; and
a thread cutting vibration adjusting unit (for example, the vibration adjusting unit 2022) that shifts, by a vibration phase shift amount set beforehand, a phase of the vibration relative to a phase of the spindle per each of the cutting-in processes to be performed the plurality of times. According to the numerical controller, where, in thread cutting on a workpiece by the machine tool, vibration is applied to two axes or more among the X axis, the Y axis, and the Z axis, it is possible to suppress core misalignment from occurring due to relative vibration between a cutting tool and the workpiece, to improve accuracy of a finished shape, and to suppress a tip of the cutting tool from being influenced.

(2) The numerical controller according to (1) described above, in which the vibration superimposing unit is configured to change frequency of the vibration. According to the numerical controller, each time a cutting-in process has taken place, frequency is gradually increased, making finer unevenness on a bottom surface of a thread on a workpiece through thread cutting.

(3) The numerical controller according to (1) or (2) described above, in which the vibration superimposing unit is configured to set amplitude of the vibration in accordance with a cutting amount in each of the cutting-in processes.

(4) The numerical controller according to any one of (1) to (3) described above, in which the vibration superimposing unit causes two axes among the three axes to vibrate.

(5) The numerical controller according to any one of (1) to (4) described above, in which the vibration superimposing unit causes the three axes to vibrate, and an angle formed between two axes among the three axes falls within a range between 0° and 90° inclusive.

(6) A second aspect of the present disclosure is a machine tool system (for example, the machine tool system 10) including:
the numerical controller (for example, the numerical controller 200) according to any one of (1) to (5) described above; and
a machine tool (for example, the machine tool 100) that allows a cutting tool and a machining target to move relative to each other to perform cutting-in processes a plurality of times on the machining target to form a thread on the machining target. According to the machine tool system, where, in thread cutting on a workpiece by a machine tool, vibration is applied to two axes or more among the X axis, the Y axis, and the Z axis, it is possible to suppress core misalignment from occurring due to relative vibration between a cutting tool and the workpiece, to improve accuracy of a finished shape, and to suppress a tip of the cutting tool from being influenced.

(7) A third aspect of the present disclosure is a numerical control method for a numerical controller (for example, the numerical controller 200) that causes a machine tool (for example, the machine tool 100) to perform an operation for performing thread cutting through which a cutting tool and a machining target are allowed to move relative to each other to perform cutting-in processes a plurality of times on the machining target to form a thread on the machining target, the numerical control method including: controlling a spindle that rotates the machining target, and drive axes having three axes;
superimposing vibration to be applied to two axes or more among the three axes on the relative movement between the cutting tool and the machining target so that the cutting tool and the machining target vibrate relative to each other along a thread groove; and
shifting, by a vibration phase shift amount set beforehand, a phase of the vibration relative to a phase of the spindle per each of the cutting-in processes to be performed the plurality of times. According to the numerical control method, where, in thread cutting on a workpiece by a machine tool, vibration is applied to two axes or more among the X axis, the Y axis, and the Z axis, it is possible to suppress core misalignment from occurring due to relative vibration between a cutting tool and the workpiece, to improve accuracy of a finished shape, and to suppress a tip of the cutting tool from being influenced.

EXPLANATION OF REFERENCE NUMERALS

10 Machine tool system
100 Machine tool
101 Linear servomotor
102 Spindle table
103 Spindle motor
104 Workpiece
105 Linear servomotor
106 Support table
107 Support column
108 Linear servomotor
119 Tool table
110 Cutting tool
200 Numerical controller
201 Analysis processing unit
202 Interpolation processing unit
203 Acceleration-deceleration processing unit
204 Control command outputting unit
205 Driver
2021 Vibration superimposing unit
2022 Vibration adjusting unit

What is claimed is:
1. A numerical controller that causes a machine tool to perform an operation for performing thread cutting through which a cutting tool and a machining target are allowed to move relative to each other to perform cutting-in processes a plurality of times on the machining target to form a thread on the machining target, the numerical controller comprising:
- a driver that controls a spindle that rotates the machining target, and drive axes having three axes;
- a vibration superimposing unit that superimposes vibration to be applied to two axes or more among the three axes on the relative movement between the cutting tool and the machining target so that the cutting tool and the machining target vibrate relative to each other along a thread groove on the machining target, wherein a direction of the vibration is parallel to a direction the thread groove extends, or the direction of the vibration is at an angle the thread groove extends; and
- a thread cutting vibration adjusting unit that shifts, by a vibration phase shift amount set beforehand, a phase of the vibration relative to a phase of the spindle per each of the cutting-in processes to be performed the plurality of times.

2. The numerical controller according to claim 1, wherein the vibration superimposing unit is configured to change frequency of the vibration.

3. The numerical controller according to claim 1, wherein the vibration superimposing unit is configured to set amplitude of the vibration in accordance with a cutting amount in each of the cutting-in processes.

4. The numerical controller according to claim 1, wherein the vibration superimposing unit causes two axes among the three axes to vibrate.

5. The numerical controller according to claim 1, wherein the vibration superimposing unit causes the three axes to vibrate, and an angle formed between two axes among the three axes falls within a range between 0° and 90° inclusive.

6. A machine tool system comprising:
   the numerical controller according to claim 1; and
   a machine tool (100) that allows a cutting tool and a machining target to move relative to each other to perform cutting-in processes a plurality of times on the machining target to form a thread on the machining target.

7. A numerical control method for a numerical controller that causes a machine tool to perform an operation for performing thread cutting through which a cutting tool and a machining target are allowed to move relative to each other to perform cutting-in processes a plurality of times on the machining target to form a thread on the machining target, the numerical control method comprising:
   controlling a spindle that rotates the machining target, and drive axes having three axes;
   superimposing vibration to be applied to two axes or more among the three axes on the relative movement between the cutting tool and the machining target so that the cutting tool and the machining target vibrate relative to each other along a thread groove on the machining target, wherein a direction of the vibration is parallel to a direction the thread groove extends, or the direction of the vibration is at an angle the thread groove extends; and
   shifting, by a vibration phase shift amount set beforehand, a phase of the vibration relative to a phase of the spindle per each of the cutting-in processes to be performed the plurality of times.

* * * * *